United States Patent
Becker, IV et al.

(10) Patent No.: US 9,222,015 B2
(45) Date of Patent: Dec. 29, 2015

(54) THERMOCHROMIC COATING AND METHOD OF MANUFACTURING THEREOF

(75) Inventors: John C. Becker, IV, Monson, MA (US); Richard S. Himmelwright, Wilbraham, MA (US)

(73) Assignee: SWIFT RIVER PROPERTIES, LLC, Palmer, MA (US)

( * ) Notice: Subject to any disclaimer, the term of this patent is extended or adjusted under 35 U.S.C. 154(b) by 1354 days.

(21) Appl. No.: 12/953,794

(22) Filed: Nov. 24, 2010

(65) Prior Publication Data

US 2011/0123712 A1      May 26, 2011

Related U.S. Application Data

(60) Provisional application No. 61/264,103, filed on Nov. 24, 2009.

(51) Int. Cl.
| | |
|---|---|
| *B32B 27/40* | (2006.01) |
| *B05D 5/06* | (2006.01) |
| *G02F 1/00* | (2006.01) |
| *C09K 9/02* | (2006.01) |

(52) U.S. Cl.
CPC ............ *C09K 9/02* (2013.01); *Y10T 428/31551* (2015.04)

(58) Field of Classification Search
CPC . C09D 163/00; C09K 9/02; Y10T 428/31551
USPC .............................. 428/424.8, 425.1; 252/583
See application file for complete search history.

(56) References Cited

U.S. PATENT DOCUMENTS

| | | | |
|---|---|---|---|
| 4,421,560 A * | 12/1983 | Kito et al. .................... | 106/31.2 |
| 4,425,161 A | 1/1984 | Shibahashi et al. | |
| 4,710,560 A | 12/1987 | Vu | |
| 5,350,634 A | 9/1994 | Sumii et al. | |
| 6,485,824 B2 * | 11/2002 | Senga et al. ................. | 428/323 |
| 6,500,555 B1 | 12/2002 | Khaldi | |
| 6,562,755 B1 | 5/2003 | Halbrook, Jr. et al. | |
| 6,881,810 B2 * | 4/2005 | Matsunami et al. ........... | 528/85 |
| 2002/0066890 A1 | 6/2002 | Senga et al. | |
| 2007/0160851 A1 * | 7/2007 | Barancyk et al. .......... | 428/423.1 |
| 2008/0108500 A1 * | 5/2008 | Iwasaki et al. ............... | 503/217 |
| 2008/0209825 A1 | 9/2008 | Smith | |
| 2008/0221251 A1 | 9/2008 | Fioratti | |

OTHER PUBLICATIONS

International Search Report and the Written Opinion of the International Searching Authority, issued in International Application No. PCT/US2011/022264, dated Jul. 26, 2011.

* cited by examiner

*Primary Examiner* — Thao T Tran
(74) *Attorney, Agent, or Firm* — Oliff PLC

(57) ABSTRACT

A thermochromic coating which comprises a thermochromic compound and a polyurea resin. The thermochromic compound and polyurea resin form a thermochromic layer. The coating optionally has a protective layer containing a resin and a UV-blocking material arranged on top of the thermochromic layer. A reflective layer containing a reflective material is optionally arranged between the thermochromic layer and the substrate. A thermochromic coating is formed by applying successive reflective, thermochromic, and protective layers on a substrate.

12 Claims, 1 Drawing Sheet

| 20 |
|---|
| 10 |
| 100 |

THERMOCHROMIC COATING AND METHOD OF MANUFACTURING THEREOF

CROSS REFERENCE TO PROVISIONAL APPLICATION

This application is based upon and claims the benefit of priority from Provisional U.S. Patent Application 61/264,103 filed on Nov. 24, 2009, the entire contents of which are incorporated by reference herein.

BACKGROUND

1) Field of Disclosure

The present disclosure is related to the field of building materials. This disclosure has particular applicability to coatings for building materials having thermochromic properties.

2) Description of Related Art

Mankind has always sought methods to improve his living conditions. The development of protective shelters provided needed safety from harsh environments. Cooling and heating systems powered by fossil fuels greatly increased the comfort of these shelters. However, there is a desire to reduce the amount of energy expended for cooling and heating for a multitude of reasons. For example, reasons include lowering the financial cost to the building owner and reducing the environmental impact from the use of fossil fuels. These reasons provide motivation to develop non-energy using means to mediate the environment of interiors.

One way of reducing the amount of energy necessary to heat and cool a structure is to alter the color of the structure's exterior. As is well known, light colors, such as white, reflect sunlight, which in turn reduces the degree to which sunlight heats up a light-colored surface. Conversely, darker colors absorb sunlight, which cause a dark surface to heat up under exposure to sunlight. Previously, however, application of this principle to buildings and other structures has not been deemed a reasonable solution, as the cost and effort necessary to periodically alter the color of structures, such as by painting or covering, was prohibitive.

Thermochromic compositions change color in response to temperature fluctuations. Conventional reversible thermochromic compositions exhibit reversible thermochromic properties such that they begin to become color-extinguished in the course of temperature rise caused in a color-developed state, present a completely color-extinguished state at a specific temperature or above, and begin to develop a color in the course of subsequent temperature drop and return to the color-developed state.

The thermal or "UVI" radiation range is the range of frequencies in the Ultraviolet, Visible and Infrared ranges which produce heat in objects, and which absorb those frequencies. The relative transparency/opacity of a thermochromic material is dynamic with respect to the trigger temperature or trigger temperature range of the specific thermochromic material. For example, a thermochromic material having a trigger temperature of precisely 72 degrees Fahrenheit would be opaque to light and thus would absorb thermal radiation in the UVI range at temperatures below 72 degrees Fahrenheit and transparent, or non-absorptive, to UVI light at temperatures above 72 degrees Fahrenheit.

Another desired property of shelters is to provide long term protection without the need for extensive repair. Rain, heat and wind cause damage to exterior surfaces and as such, a means to prevent the deterioration of these surfaces is an ever present goal in the field of structure design. One form of protection is the use of polyurethane coatings to protect exposed surfaces from harmful elements. For example, U.S. Pat. No. 4,710,560 is directed toward a hydrophobic, crosslinked polyurethane for use as a corrosion inhibiting coating on exposure to moisture at atmospheric conditions.

However, although the coating of a polyurethane resin can show various kinds of properties depending upon the composition thereof, an important defect of the polyurethane resin is the discoloration and the deterioration such as hydrolysis, when exposed to the outdoors over a long period of time. Therefore, polyurethane resin coatings can be unsuitable for uses in which good durability is required.

It is also known that thermochromic materials can be added to thermoplastics, polyvinyl chloride (PVC) or other resins and molded into any shape or design or made into sheets. The use of thermochromic materials in the coatings of structures has been explored. For example, Khaldi (U.S. Pat. No. 6,500,555) discloses thermochromic laminates, which predictably vary their ability to absorb or reflect electromagnetic radiation. However, without the proper medium for which the thermochrome is carried, the thermochrome and the coating are quickly deteriorated upon exposure to the elements.

Smith also teaches, in US Application 2008/0209825, a color changing system for structures that uses polyurethane laminates in a layered structure. However, as indicated above, problems occur with the use of polyurethanes alone.

SUMMARY

In order to overcome the problems discussed above, the present disclosure is directed to a thermochromic coating which comprises a thermochromic compound and a polyurea resin, wherein the thermochromic compound and polyurea resin form a thermochromic layer. The coating optionally comprises a protective layer containing a resin and a UV-blocking material, and the protective layer is arranged on top of the thermochromic layer. Optionally, a reflective layer containing a reflective material is arranged between the thermochromic layer and the substrate.

The present disclosure is also directed toward a method for forming a thermochromic coating on a substrate comprising the step of forming a thermochromic layer on the substrate, wherein the thermochromic layer comprises a thermochromic compound and a polyurea resin.

In another embodiment, the thermochromic coating also contains a protective layer and reflective layer also formed of a resin. In certain embodiments, the protective and reflective layers use polyurea as the resin. Optionally, other resins may also be used, such as polyurethane, epoxy, acrylic, flouropolymers, silicones, polyvinylideneflouride (PVDF), polyvinylchloride (PVC), rubbers including but not limited to epdm, and thermoplastic polyolefins (tpo).

In another embodiment of the present disclosure, the thermochromic layer further comprises a UV-blocking material. Optionally, a thermochromic coating comprises one layer containing a thermochromic compound, a UV-blocking material, and a resin. The thermochromic compound and the UV-blocking material are interspersed within the resin material.

Additional advantages and other features of the present disclosure will be set forth in part in the description which follows and in part will become apparent to those having ordinary skill in the art upon examination of the following or may be learned from the practice of the disclosure. The advantages of the disclosure may be realized and obtained as particularly pointed out in the appended claims.

As will be realized, the present disclosure is capable of other and different embodiments, and its several details are capable of modifications in various obvious respects, all without departing from the disclosure. Accordingly, the figures and description are to be regarded as illustrative in nature, and not as restrictive.

BRIEF DESCRIPTION OF THE FIGURES

The figures depict one or more implementations in accordance with the present teachings by way of example, not by way of limitation. In the figures, like reference numerals refer to the same or similar elements.

DETAILED DESCRIPTION

The thermochromic coatings and methods for manufacturing the coatings of the present disclosure employ a coating or a multilayer structure that changes color in response to heating by sunlight or other thermal or radiation source. The coating changes from a certain color to white upon increasing temperature. The change in color to white will then reduce the absorption of IR radiation and thereby significantly reduce the heating of the roof structure.

Figure 1:
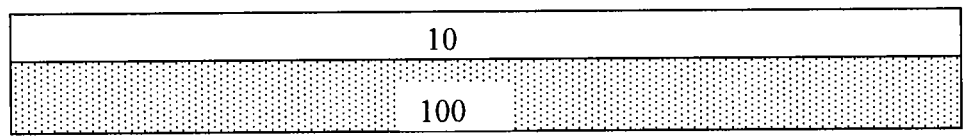
FIG. 1 is a side view of a thermochromic coating according to one embodiment of the present disclosure.

In one embodiment shown in FIG. 1, a thermochromic layer 10 is deposited on a substrate 100 such as EPDM rubber or the like and installed much the same way conventional roll roofing is installed. The thermochromic layer 10 contains one or more thermochromic molecules, a UV resistant protective compound and a polyurea resin to form a thermochromic coating. One example of the polyurea carrier resin is an aliphatic polyurea.

Polyureas are the reaction product of an isocyanate or polyisocyanate composition and an amine or polyamine composition. By careful selection of the isocyanate component, in conjunction with selection of the amine component, highly beneficial properties of a novel polyurea coating material are obtained. The selection of these ingredients, together with selection of optional alcohol or polyol components, results in a highly durable coating that has low porosity, high elongation, and high hardness. Additionally, the selection of these components provides an environmentally friendly composition because it generates substantially no volatile organic compounds (VOCs). The ease and lower cost in generation of coatings according to the present invention provides substantial manufacturing benefit and environmental benefit to both the manufacturer and the public at large.

The thermochromic coating composition of the present invention surprisingly may be applied with excellent aesthetic results in an extremely easy manner. Because of the selection of the ingredients, the composition may be sprayed or applied onto a surface or used in the formation of a composite, resulting in a high density and hard surface previously only achievable through a lamination process utilizing heat and pressure. Thus, thin hard films may be easily prepared in an environmentally friendly manner.

Figure 2:
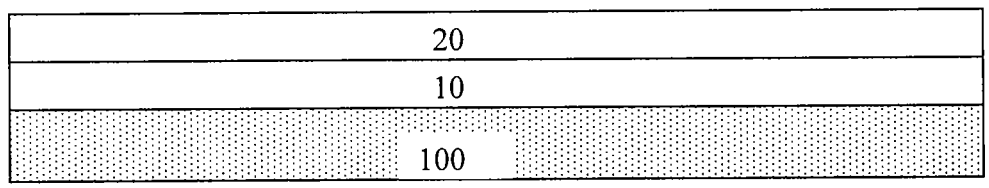
FIG. 2 is a side view of a thermochromic coating according to another embodiment of the present disclosure.

Optionally, the thermochromic coating is comprised of a two layer structure. For example, as is shown in FIG. 2, a thermochromic color changing layer 10 is first deposited on a substrate 100. A protective layer 20 is applied over the color changing layer 10. This protective coating 20 provides protection from weather and UV degradation. The thermochromic molecules available today are generally unstable to long term exposure to UV radiation in sunlight. Therefore the protective layer 20 is either applied as a separate layer or added to the single component structure. The protective layer 20 should be substantially clear as to allow for the thermochromic coating to be visible through the protective layer.

Figure 3:
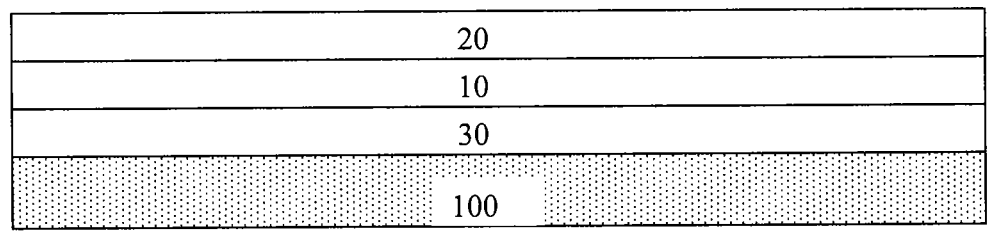
FIG. 3 is a side view of a thermochromic coating according to another embodiment of the present disclosure.

In another embodiment such as that shown in FIG. 3, a three layer structure forms the thermochromic coating. The thermochromic coating is structured such that a reflective layer 30 is deposited on a substrate 100. In some embodiments, a thermochromic color changing layer 10 is applied over the reflective layer 30. Then, a protective layer 20 is applied over the thermochromic layer 10. The protective layer 20 may be used for weather protection and UV protection. Polyurea resins comprise at least one of the layers for this structure. Polyureas provide excellent outdoor exposure properties for applications like roofing and others.

In some embodiments, the resin further comprises a dendrimer or hyper-branched compound covalently bonded to the polyurea. Dendrimers and hyper-branched molecules are generally described as macromolecules, which are characterized by highly branched 3D structures that provide a high degree of surface functionality and versatility. Dendrimers are synthesized from a molecule containing a central atom, such as nitrogen, to which carbon and other elements are covalently bound by a repeating series of chemical reactions that produce a spherical branching structure. As the process repeats, successive layers are added, and the sphere can be expanded to the desired size. One result of the repeating chemical syntheses is a spherical macromolecular structure. Hyper-branched molecules do not generally have a structure as defined as dendrimers. However, hyper-branched molecules contain multiple branches much like dendrimers.

Dendrimers and other highly branched polymeric structures having amine end-groups are termed "amino-terminated". These end groups may be utilized in the reactions to form polyureas which result in highly branched polymers of high molecular weight. The high branching adds strength and high thermal stability to the polyurea.

Other resins capable of being utilized as resin materials for use in the layers such as the reflective layers 30 and/or protective layers 20 in the present disclosure include polyurethane, epoxy, acrylic, polyvinyl alcohol, polyvinyl acetate, polyvinyl chloride, polyester, polyimide, polyether ether ketone, and polycarbonate.

The protective layer 20 uses nano-scale particles of titanium dioxide, iron oxide or other UV blocking inorganic material. Alternatively, these nano-scale particles may be used in combination with well established organic UV blockers such as Tinuvins™ (Ciba) to yield very strong UV protection while allowing full transmittance of the visible/IR wavelengths that lead to heating. The importance of nano-scale particles is that when particle size is controlled to be below a given wavelength of light, the particle can no longer absorb or block that wavelength. For optimum use of the thermochromic properties of the coating, it is desirable to block all light exhibiting a wavelength below about 400 nm (block UV) and let all light exhibiting a wavelength above 400 nm (visible/IR) to pass through. As such, in certain embodiments of the present disclosure, the UV-blocking material comprises particles having a diameter of from 0.005 µm to 0.4 µm. In other embodiments, the particles have a diameter of from 0.01 µm to 2.5 µm.

The concentration of the UV-blocking particles should be sufficient to provided adequate long term protection of the thermochromic molecules in the thermochromic coating.

Generally, the more UV-absorbing particles present in the coating, the greater the protection. However, too high of concentration of the UV-absorbing particles would cause problems in solubility of the particles, and added cost of components of the coating. In some embodiments, the concentration of particles in the resin layer is from 0.1 wt % to 50 wt % of the total weight of the layer. In other embodiments, the concentration of particles in the resin layer is from 0.1 wt % to 15 wt % of the total weight of the layer. In yet other embodiments, the concentration is from 0.5% to 1.0% of the total weight of the layer.

UV-blocking particles are comprised of titanium oxide or iron oxide. However, any UV-blocking material suitable for use with the materials disclosed herein is acceptable.

In some embodiments of the present disclosure, the thermochromic compound is at least one selected from liquid crystals, cholesteric liquid crystals, microencapsulated liquid crystals, leuco dyes, microencapsulated leuco dyes, spirolactones, spiropyrans, fluorans, cholesteryl nonanoates, cyanobiphenyls and inorganic pigments. However, the present disclosure is applicable to any suitable thermochromic compound that can be formulated in a polyurea resin and have a transition temperature within the ranges needed for outdoor use.

In some embodiments, the present disclosure uses thermochromic materials that have a transition temperature of from about 5° C. to about 90° C. More specific temperature ranges for transition temperatures of thermochromic materials of the present disclosure are from about 15° C. to about 30° C. In some embodiments, the transition temperature of the thermochromic material is 27° C.

According to the present disclosure, the method for forming a thermochromic coating on a substrate comprises a step of applying a thermochromic layer 10 on the substrate 100. The thermochromic layer 10 is made of a thermochromic compound and a polyurea resin. In other embodiments, the method further comprises a step of forming a protective layer 20 on the thermochromic layer 10, the protective layer 20 having a UV-blocking material in a resin. According to one embodiment, the resin is a polyurea resin. However, other resins, such as polyurethane, epoxy, acrylic polyvinyl alcohol, polyvinyl acetate, polyvinyl chloride, polyester, polyimide, polyether ether ketone, and polycarbonate may be used in the protective layer.

In another embodiment of the present disclosure, the protective layer 20 is adhered to the thermochromic layer 10 by use of an adhesive. Any suitable adhesive that can withstand exposure to outdoor elements may be used.

In other embodiments, the method for forming a thermochromic coating further comprises a step of, before forming the thermochromic layer 10, forming a reflective layer 30 on the substrate 100 such that the reflective layer 30 is located between the substrate 100 and the thermochromic layer 10.

In some embodiments, the substrate 100 is a carrier film, a scrim structural sheet, a cellulosic carrier sheet, a non-woven carrier sheet, ethylene-propylene diene rubber, chlorosulfonated polyethylene rubber, asphalt shingles, a roof, a pipeline, a delivery pipe, a chemical reactor, an industrial structure and a residential structure. However, applications of the present disclosure are not limited by these examples. It is the Applicants' intention that the thermochromic coatings may be applied to any surface.

Figure 4:
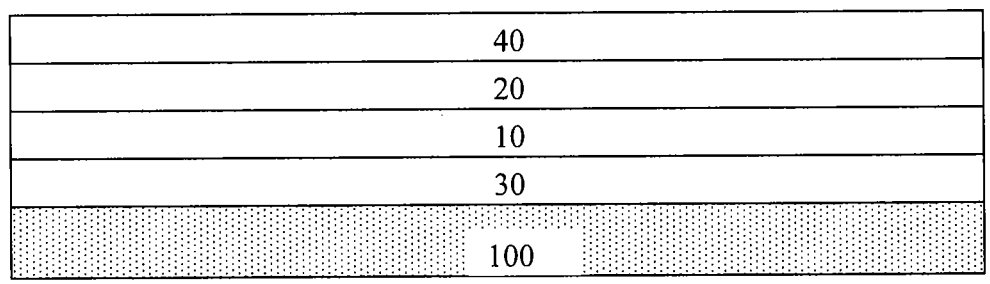
FIG. 4 is a side view of a thermochromic coating according to another embodiment of the present disclosure.

In another embodiment of the present disclosure, a method in which additional layers of thermochromes are added in order to reload or recharge a coating, but not replace the entire roof coating structure, is provided. The method involves, in addition to any of the steps mentioned previously, forming an additional layer 40 on the substrate, wherein the additional layer 40 comprises a thermochromic compound and a polyurea resin. A representative structure of such a thermochromic coating is shown in FIG. 4. This method optionally includes a maintenance activity comprising a wash down of the roof structure, an "opening" of channels in the coating via a solvent wash (hopefully acetone or t-Bac or the like, delisted no-VOC solvents) and simple brushing or rolling of the surface with thermochromic compounds. As such, another embodiment of the present disclosure is adding a further a step of forming an additional layer 40 on the substrate, wherein the additional layer 40 comprises a thermochromic compound and a polyurea resin.

Optionally, another embodiment is a method to coat very thin layers of thermochromic materials on peelable sheets that could be removed periodically.

As thermochromic molecules are susceptible to degradation and decomposition during use with high temperature/high pressure impingement spray equipment which is common in the polyurea/polyurethane industry, applying these coated layers by low pressure cold spray or brush/roll/squeegee is desirable.

The ability to deposit any of the structures in a factory environment to generate rolls of finished goods that would be then shipped to jobsites and applied by roofing contractors is desirable. This is particularly important when polyureas are used as layer materials. The process includes casting polyurea resin layers onto a release sheet or structural receiver from a typical slot die coating head and then oven curing the web in line. At a rewind station the polyurea will be stripped, if a release sheet is used, and rolled up on a spool to yield wide webs of roofing material for use. In addition, the reactive chemistry we will be depositing will require very good process control and in-line mixing capabilities that narrow the number of machines that will be capable of producing this material. These roll goods are converted (slit and/or chopped for example) into tiles, shingles, sheets, etc. for use in the field.

Another embodiment of the present disclosure is a method of multilayer slot die coating. This coating method allows the deposition of a single layer that contains a multilayer internal structure. This structure provides for an internal structure with the UV protection at a top surface, a thermochrome in the middle and a highly reflective layer at the bottom, in one application.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the disclosure. However, it should be recognized that the present disclosure can be practiced without resorting to the details specifically set forth. In other instances, well known processing structures have not been described in detail, in order not to unnecessarily obscure the present disclosure.

Only a few examples of the present disclosure are shown and described herein. It is to be understood that the disclosure is capable of use in various other combinations and environments and is capable of changes or modifications within the scope of the inventive concepts as expressed herein.

EXAMPLES

Example 1

A thermochromic coating was made by dispersing a thermochromic pigment in the B Side of a two component polyurea based formulation. The resulting cast thermochromic material was subjected to a heat source to raise the temperature. The thermochromic coating changed color from magenta to clear passing through a temperature range of about 85 F to 95 F (29° C. to 35° C.) demonstrating the desired effect.

Two percent by weight of the thermochromic pigment Matsui Chromicolor Magenta (F-O) Type 37 was dispersed by gently mixing into the Side B formulation described below. The Side A and Side B components were then mixed together by passing through a multi-plate hand delivered mixing element and cast onto a release layer. The material was spread and allowed to gel and then cure at room temperature. The cast film achieved full cure in about seven days. The free standing plastic film was repeatedly cycled from room temperature to about 110 F (43° C.). At approximately 90 F (32° C.), the magenta color faded leaving a near clear colorless film. On cooling the magenta color was regenerated.

| Side A | Wt % in Mix |
| --- | --- |
| Bayer Desmadur N-3300A Aliphatic Isocyanate | 79.2 |
| Bayer Desmadur N-3400 Aliphatic Isocyanate | 19.0 |
| King Industries K-Kat 6212 Zirconium Catalyst | 2.0 |
| Kaufmann Perenol E-8 Air Release Agent | 1.0 |

| Side B | Wt % in Mix |
| --- | --- |
| Bayer Desmophen 550U Polyol | 35.0 |
| King K-Flex188 Polyol | 35.0 |
| King K-Flex XM-308 Polyol | 20.0 |
| Dorf Katel Clearlink 1000 Diamine | 7.9 |
| Matsui Chromicolor Magenta (F-O) Type37 Pigment | 2.0 |
| Kaufmann Perenol E-8 Air Release Agent | 0.1 |

Example 2

A thermochromic coating was made by dispersing five weight percent of a thermochromic pigment into the B Side of a two component polyurea formulation. The resulting cast thermochromic element was temperature cycled and demonstrated the desired color change.

Five percent by weight of the thermochromic pigment Hallcrest Black was dispersed by gently mixing into the B Side formulation shown below. The Side A and Side B components were then stirred together in a vessel for two minutes. The resulting liquid was spread with a foam paint brush onto a release surface and allowed to cure. The material was fully cured after two days and subjected to heat cycle testing. The material changed from black to a very light gray on passing through a temperature range of about 85 F to 95 F. On cooling the black color was regenerated in the sample.

| Side A | Wt % in Mix |
| --- | --- |
| Industrial Copolymers Incorez 701 Isocyanate | 19.9 |
| Bayer N3600 Aliphatic Isocyanate | 79.9 |
| Kaufmann Perenol E-8 Air Release Agent | 0.2 |

| Side B | Wt % in Mix |
| --- | --- |
| Reactamine 3000SP Diamine | 24.5 |
| Bayer NH 1420 Polyapartic Amine | 69.9 |
| Hallcrest Black Thermochromic Pigment | 5.0 |
| Kaufmann Perenol E-8 Air Release Agent | 0.2 |

| Side B | Wt % in Mix |
| --- | --- |
| Industrial Copolymers Incozol 2 Moisture Scavenger | 0.4 |

Example 3

A thermochromic coating was made by dispersing two weight percent of a thermochromic pigment into the B Side of a two component polyurea based formulation. The resulting spray applied thermochromic element was temperature cycled and demonstrated the desired color change.

Two percent by weight of the Hallcrest Thermochromic Liquid Crystal Black Pigment was dispersed by gently mixing into the B Side formulation shown below. The Side A and Side B components were mixed and sprayed using a pneumatic piston driven cartridge spray system. The material was delivered to the static mixing element at 15 psi piston pressure and 20 psi aerosol pressure. The material was sprayed onto a release layer and allowed to cure. The material was fully cured in seven days and subjected to thermal cycle testing. The coated material changed from black to a very light gray on passing through a temperature range of about 85 F to 95 F. On cooling the original black color was regenerated.

| Side A | Wt % in Mix |
| --- | --- |
| Bayer Desmadur N-3300A Aliphatic Isocyanate | 79.2 |
| Bayer Desmadur N-3400 Aliphatic Isocyanate | 19.0 |
| King Industries K-Kat 6212 Zirconium Catalyst | 2.0 |
| Kaufmann Perenol E-8 Air Release Agent | 1.0 |

| Side B | Wt % in Mix |
| --- | --- |
| Bayer Desmophen 550U Polyol | 35.0 |
| King K-Flex188 Polyol | 35.0 |
| King K-Flex XM-308 Polyol | 20.0 |
| Dorf Katel Clearlink 1000 Diamine | 7.9 |
| Hallcrest Thermochromic Liquid Crystal Black | 2.0 |
| Kaufmann Perenol E-8 Air Release Agent | 0.1 |

Example 4

A thermochromic coating was made by dispersing two weight percent of a thermochromic pigment mixture into the B Side of a two component polyurea based formulation. The resulting spray applied thermochromic element was temperature cycled and demonstrated the desired color change.

Two percent by weight of a thermochromic pigment mixture prepared from a series of thermochromic pigments obtained from Kelly Chemical and shown below was dispersed by gently mixing into the B Side formulation shown below. The Side A and Side B components were mixed and sprayed using a pneumatic piston driven cartridge spray system. The material was delivered to the static mixing element at 125 psi piston pressure and 50 psi aerosol pressure. The material was sprayed onto a release layer and allowed to cure. The material was fully cured and subjected to thermal cycle testing. The coated material changed from brown to a very light beige on passing through a temperature range of about 80 F (27° C.) to 90 F. On cooling the original brown color was regenerated.

| Side A | Wt % in Mix |
|---|---|
| Bayer Desmadur N-3300A Aliphatic Isocyanate | 79.2 |
| Bayer Desmadur N-3400 Aliphatic Isocyanate | 19.0 |
| King Industries K-Kat 6212 Zirconium Catalyst | 2.0 |
| Kaufmann Perenol E-8 Air Release Agent | 1.0 |

| Side B | Wt % in Mix |
|---|---|
| Bayer Desmophen 550U Polyol | 34.0 |
| King K-Flex188 Polyol | 34.0 |
| King K-Flex XM-308 Polyol | 19.0 |
| Dorf Katel Clearlink 1000 Diamine | 7.15 |
| Kelly Chemical Thermochromic Pigment Mixture* | 5.75 |
| Kaufmann Perenol E-8 Air Release Agent | 0.1 |

*The Kelly Thermochromic Pigment Mixture contains 17% Orange OT-31, 9% Magenta MT-31, 9% Black LT-31 and 65% Green GT-31.

Example 5

The material prepared as in Example 3) above was further coated with a UV protective layer comprising a nano-size TiO2 dispersion prepared by dispersing Sachtleben Hombitec RM 110 into a polyurea. The nano-size TiO2 dispersion was prepared according to the formulation below. The polyurea resin system labeled 750-2-2 is also shown below.

| Item | wt added in grams |
|---|---|
| 750-2-2 Side B | 13 |
| Sachtleben Hombitec RM 110 | 0.65 |
| 750-2-2 FL Side A | 9.5 |

1) The HRM 110 was dispersed in 750-2-2 by aggressively stirring the pigment into the liquid.
2) 750-2-2 FL Side A was then added followed by aggressive stirring.
3) The resulting dispersion was ready for coating.

| Side A | Wt % in Mix |
|---|---|
| Bayer 3600 Aliphatic Isocyanate | 93.0 |
| Huntsman Propylene Carbonate | 7.0 |

| Side B | Wt % in Mix |
|---|---|
| Bayer Vestamine | 23.0 |
| Bayer NH 1420 Polyaspartic Amine | 55.0 |
| Bayer NH1520 Polyaspartic Amine | 19.0 |
| Kaufmann Perenol E-8 | 1.0 |
| Industrial Copolymers Incozol 2 | 2.0 |

The nano-size TiO2 dispersion was coated on one side of the sprayed Hallcrest Black prepared from Example 3) above at 10 mil coating thickness. The resulting two layer system was allowed to cure for two days. The resulting cured sample was thermally cycled to demonstrate the desired color change from black to very light gray. Then the sample was placed in a QUV ultraviolet exposure device for one hour. After removal from the QUV unit the sample was again thermally cycled and the desired color change from black to very light gray was again observed. This process was repeated four times with the same result demonstrating the nano-size TiO2 UV protective layer was preventing damage to the thermochromic pigments by absorbing the UV radiation.

Example 6

A two layer UV protected thermochromic film was prepared by coating a nano-size TiO2 dispersion on a release Teflon block. Then a thermochromic black layer was deposited on top of the already coated UV protective layer. The sample was allowed to cure for two days, peeled from the release block and then subjected to thermal and QUV exposure testing.

The UV protective layer was prepared according to the formulation below and then coated at 20 mil thickness onto a Teflon release block.

| Item | wt added in grams |
|---|---|
| 750-2-2 Side B | 13 |
| Sachtleben Hombitec RM 110 | 0.65 |
| 750-2-2 FL Side A | 9.5 |

1) The HRM 110 was dispersed in 750-2-2 by aggressively stirring the pigment into the liquid.
2) 750-2-2 FL Side A was then added followed by aggressive stirring.
3) The resulting dispersion was ready for coating.

The thermochromic layer was prepared according to the formulation below and coated over the UV protective layer at a thickness of 30 mil. The system was allowed to cure for two days at room temperature and then the film was peeled from the release block.

The two layer black thermochromic film was thermally cycled and the desired color change from black to very light gray was observed. The film was then exposed to ultraviolet radiation in a QUV unit for one hour. After removal from the QUV unit the film was again thermally cycled and the desired color change was observed. This demonstrates the UV protective layer was absorbing the damaging ultraviolet radiation and protecting the thermochromoc pigment. This thermal/UV cycling was repeated four times with the same result.

Example 7

A three layer composite UV protected thermochromic structure was prepared by coating a thermochromic black layer onto a Teflon block. The sample was allowed to cure for two days, peeled from the release block and then adhered to a white carrier sheet with a pressure sensitive adhesive to provide support for the thermochromic layer. To the opposite side of the thermochromic layer a UV protective film was also adhered to the thermochromic layer to provide protection from UV light damage.

The UV protective layer is F007-005 obtained from UV Process Supply, Inc. The thermochromic layer was prepared as shown in Example 2.

The three layer black thermochromic composite was thermally cycled and the desired color change from black to very light gray was observed. The film was then exposed to ultraviolet radiation in a QUV unit for 24 hours. After removal from the QUV unit the film was again thermally cycled and the desired color change was observed. The area not protected by the UV protective layer showed significant damage from the UV light exposure and did not demonstrate the desired full color change. This demonstrates the UV protective layer was absorbing the damaging ultraviolet radiation and protecting the thermochromic pigment.

Example 8

A three layer composite UV protected thermochromic structure was prepared by coating a thermochromic black layer onto a Teflon block. The sample was allowed to cure for two days, peeled from the release block and then adhered to a white carrier sheet with a pressure sensitive adhesive to provide support for the thermochromic layer. To the opposite side of the thermochromic layer a UV protective film was also adhered to the thermochromic layer to provide protection from UV light damage.

The UV protective layer is F007-005 obtained from UV Process Supply, Inc. to which a TiO2 additional UV protective nano-dispersion was coated at 10 mil thickness. The thermochromic layer was prepared as shown in Example 2.

The three layer black thermochromic composite was thermally cycled and the desired color change from black to very light gray was observed. The film was then exposed to ultraviolet radiation in a QUV unit for 24 hours. After removal from the QUV unit the film was again thermally cycled and the desired color change was observed. The area not protected by the UV protective layer showed significant damage from the UV light exposure and did not demonstrate the desired full color change. This demonstrates the UV protective layer was absorbing the damaging ultraviolet radiation and protecting the thermochromic pigment.

The invention claimed is:

1. A thermochromic roofing material, comprising:
   a substrate; and
   a thermochromic coating arranged on the substrate,
   wherein the thermochromic coating comprises:
      a first layer containing:
         a thermochromic compound; and
         a polyurea resin; and
      a second layer containing:
         a resin; and
         a UV-blocking material,
      wherein:
         the second layer is arranged over the first layer,
         the UV-blocking material comprises particles having a diameter of from 0.005 $\mu$m to 0.4 $\mu$m,
         the substrate is one selected from the group consisting of: a scrim structural sheet, a cellulosic carrier sheet, a nonwoven carrier sheet, chlorosulfonated polyethylene rubber, asphalt shingles, ethylene propylene diene rubber, and a roofing material; and the thermochromic compound is at least one selected from the group consisting of leuco dyes, microencapsulated leuco dyes, spirolactones, spiropyrans, fluorans, cholesteryl nonanoates, and cyanobiphenyls.

2. The thermochromic roofing material of claim 1, wherein the thermochromic coating further comprises:
   a third layer containing a reflective layer arranged under the first layer.

3. The thermochromic roofing material of claim 2, wherein the reflective layer arranged under the first layer comprises a UV-blocking material.

4. The thermochromic roofing material of claim 3, wherein the UV-blocking material in the reflective layer comprises particles having a diameter of from 0.005 $\mu$m to 0.4 $\mu$m.

5. The thermochromic roofing material of claim 1, wherein the second layer contains a polyurea resin.

6. The thermochromic roofing material of claim 1, wherein the first layer further comprises a UV-blocking material.

7. The thermochromic roofing material of claim 1, wherein the concentration of particles in the second layer is from 0.1 wt % to 50.0 wt % of the total weight of the layer.

8. The thermochromic roofing material of claim 1, wherein the polyurea is an aliphatic polyurea.

9. The thermochromic roofing material of claim 1, wherein the polyurea resin further comprises a dendrimer or hyperbranched compound covalently bonded to the polyurea.

10. The thermochromic roofing material of claim 1, wherein the thermochromic compound has a thermochromic transition temperature of from 5° C. to 90° C.

11. The thermochromic roofing material of claim 1, wherein the particles are comprised of a titanium oxide.

12. The thermochromic roofing material of claim 1, wherein the particles are comprised of an iron oxide.

* * * * *